United States Patent [19]

Williams

[11] Patent Number: 4,945,779

[45] Date of Patent: Aug. 7, 1990

[54] BALL SCREW ROTARY ACTUATOR

[75] Inventor: Mark Williams, Thousand Oaks, Calif.

[73] Assignee: HR Textron, Inc., Valencia, Calif.

[21] Appl. No.: 136,630

[22] Filed: Dec. 22, 1987

[51] Int. Cl.[5] .................... B64C 13/36

[52] U.S. Cl. .................... 74/99 R; 92/31; 92/33; 244/78; 244/213

[58] Field of Search .................... 74/99 A, 99 R; 92/31, 92/33; 244/78, 213

[56] References Cited

U.S. PATENT DOCUMENTS

| | | | |
|---|---|---|---|
| 3,255,806 | 6/1966 | Meyer et al. | 92/33 |
| 3,393,610 | 7/1968 | Aarvold | 92/33 |
| 4,134,329 | 1/1979 | Belliere | 92/70 |
| 4,313,367 | 2/1982 | Weyer | 92/33 |
| 4,691,582 | 9/1987 | Weyer | 74/409 |
| 4,738,415 | 4/1988 | Weyer | 244/78 |
| 4,745,847 | 5/1988 | Voss | 92/33 |

*Primary Examiner*—Leslie A. Braun

*Assistant Examiner*—Scott Anchell

*Attorney, Agent, or Firm*—Nilsson, Robbins, Dalgarn, Berliner, Carson & Wurst

[57] ABSTRACT

A linear to rotary ball screw actuator which includes both helical grooves and straight grooves longitudinally spaced apart on the outer surface of the shaft. Matching helical grooves and straight grooves are formed on opposed inner surfaces of first and second portions of relatively moveable housing to provide passageways filled with balls. A return passageway is provided through the housing by way of a straight bore parallel to the longitudinal axis of the shaft.

Also disclosed is a ball screw rotary actuator of the type above described but having an additional section including either straight or helical grooves thereby to define an actuator having either a central helically grooved portion sandwiched between straight grooved portions or alternatively a central straight grooved portion with helical grooved portions on either side thereof.

21 Claims, 4 Drawing Sheets

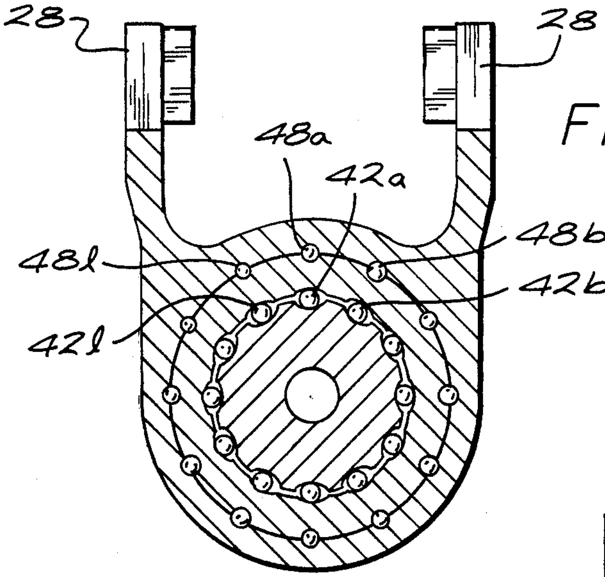
FIG. 2
FIG. 3
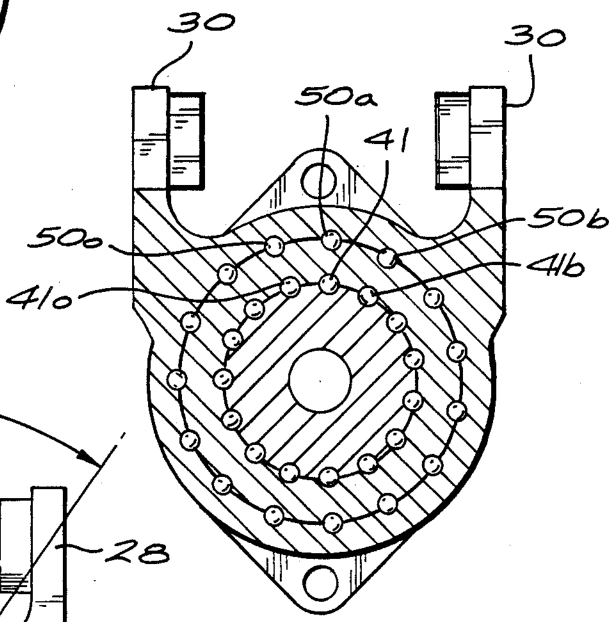
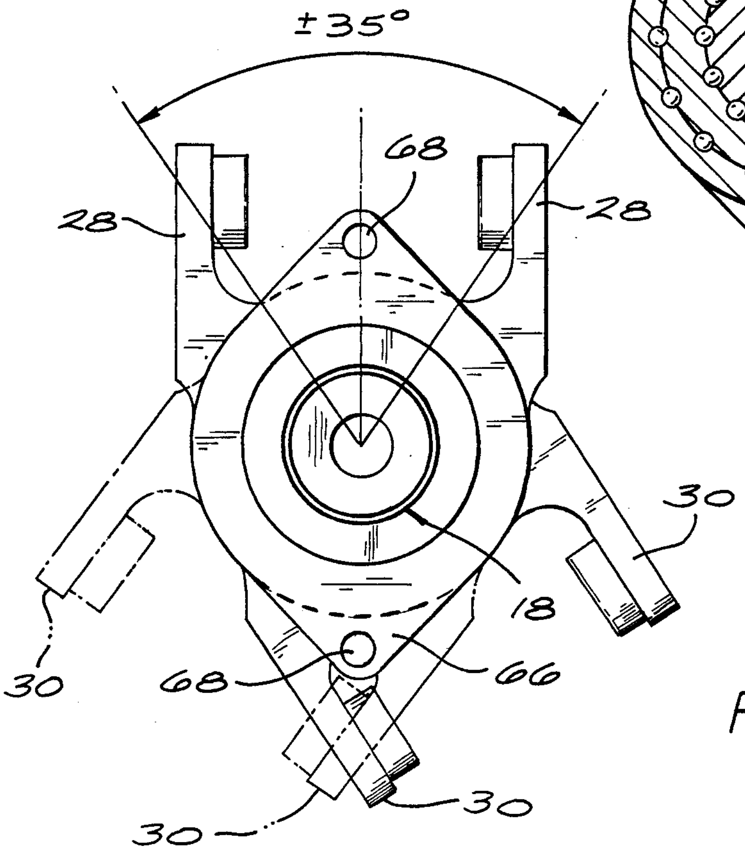
FIG. 4

BALL SCREW ROTARY ACTUATOR

FIELD OF THE INVENTION

This invention relates generally to actuators and more particularly to a ball screw rotary actuator adapted for converting a linear input motion to a rotary output motion.

BACKGROUND OF THE INVENTION

There are, existing in the prior art, numerous actuating devices which function to convert linear motion to rotary motion or alternatively rotary to linear motion through utilization of ball screw actuating mechanisms. Such prior art devices are exemplified by those illustrated in U.S. Pat. Nos. 2,197,155, 2,705,939, 2,804,054, 3,062,070, 3,162,098, 3,192,783, 4,134,329, 4,199,999, 4,290,344, 4,325,535, British Patent No. 890,440 Feb. 28, 1962, and in Soviet Union Patent Nos. 397,688 Jan. 24, 1974 and 784,429 May 17, 1980.

The devices illustrated in the prior art function to provide the desired linear to rotary or rotary to linear motion conversion quite adequately. However, the devices illustrated are, where high power output is required, quite bulky and heavy. If a device of the prior art type is light in weight or is relatively small, then the power output is quite small.

The present invention is particularly adapted for utilization in aerospace vehicles to position a flight control surface. More particularly the device is intended to be used in such a manner that the axis of the actuator's rotary output is coincident with the hinge line axis of rotation of the flight control surface. Therefore, the rotary actuator envelope restrictions are such that the actuator must fit within the basic aerodynamic mold lines of the airfoil of which the control surface is a part. At the same time, the actuator has a relatively high power output to position the control surface, particularly when the aerospace vehicle is traveling at high speeds.

None of the prior art devices exemplified by those illustrated in the above-referred-to patents are capable of meeting the required low profile high power to weight and high power to volume required for a hinge line actuator for an aerospace vehicle control surface.

SUMMARY OF THE INVENTION

A ball screw rotary actuator to convert a linear input into a rotary output motion utilizing recirculating balls and which includes a hollow housing having first and second sections relatively angularly moveable with respect to each other. Mounted within the hollow housing is a shaft which may be reciprocally moved and which defines on its outer surface longitudinally spaced apart helical and straight grooves which match helical and straight grooves formed on the interior faces of the two sections of the hollow housing. A plurality of balls are disposed within and fill channels formed by the matching grooves and also fill ball return paths which are defined within the housing. Thus as the shaft is reciprocated within the housing, the balls moving within the matched helical grooves impart rotary motion to the shaft while the portion of the housing having the straight grooves therein is caused to rotate thereby converting the linear input motion of the shaft to a rotary output motion.

BRIEF DESCRIPTION OF THE DRAWINGS

FIG. 2 is a cross sectional view taken about the lines 2—2 of FIG. 1;

FIG. 3 a cross sectional view taken about the lines 3—3 of FIG. 1;

FIG. 4 is an end view of the actuator of FIG. 1 illustrating the angular rotary output positioning of the output member of the actuator from one extreme position to the other;

DETAILED DESCRIPTION

Figure 1:
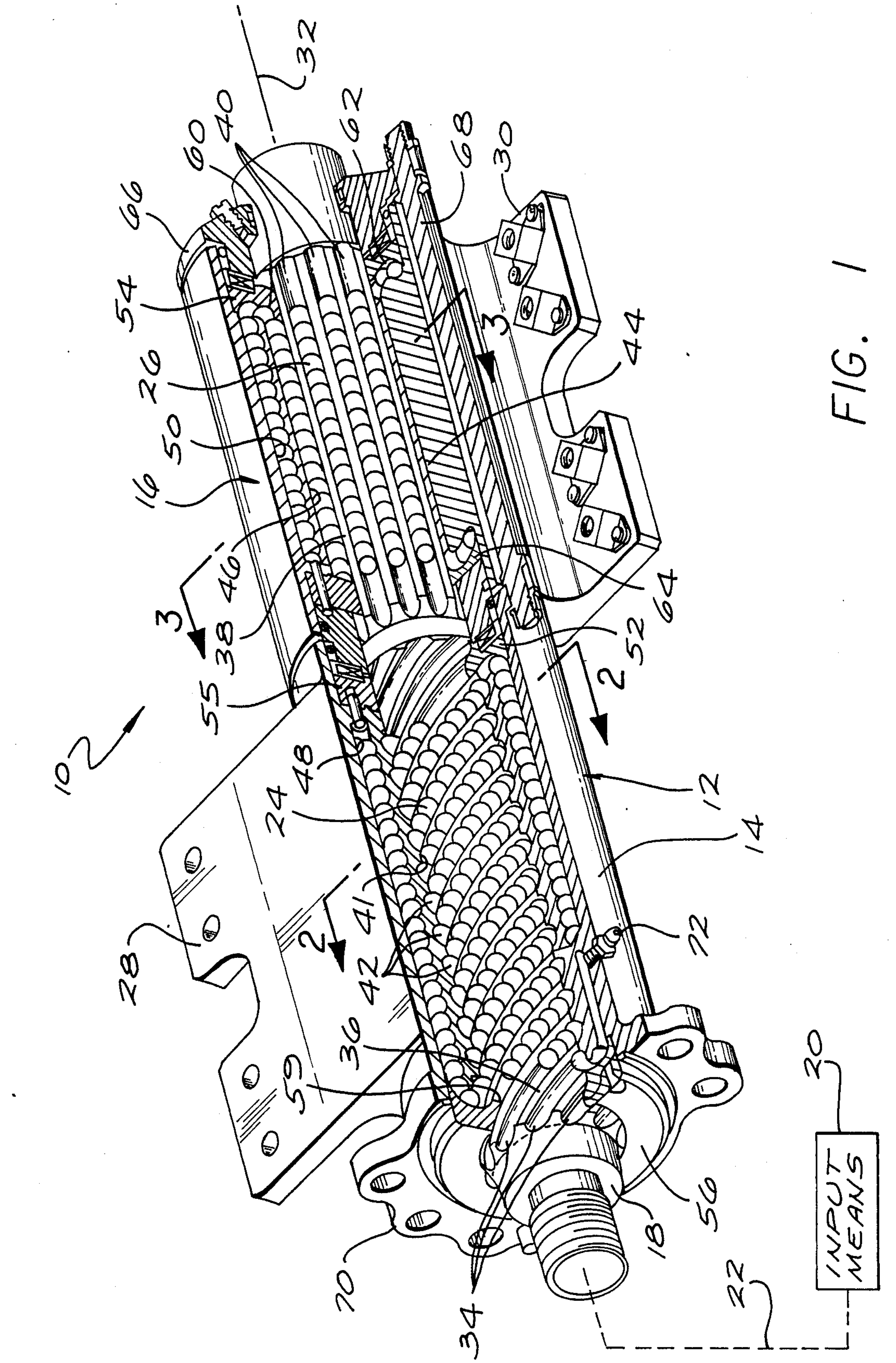
FIG. 1 is an isometric view, partially in cross section, of an actuator constructed in accordance with the principles of the present invention and shown in its neutral position.

As illustrated in FIG. 1, an actuator constructed in accordance with principles of the present invention is designed to convert a linear motion to a rotary output motion and has a relatively low profile while providing a high power to weight and a high power to volume output. As is therein illustrated, the actuator 10 includes a hollow housing 12 having a first section 14 and a second section 16. As will become more fully apparent herein below, the sections 14 and 16 of housing 12 are relatively moveable with respect to each other in an angular relationship about the longitudinal axis thereof. A shaft 18 is mounted within the hollow housing 12 for reciprocal movement and input means 20 is coupled as is illustrated by the dash line 22 to the shaft 18 for imparting reciprocal movement thereto. As illustrated the actuator 10 is in its neutral position.

A plurality of balls 24 are disposed within channels or passageways formed by matching helical grooves formed within the outer surface of the shaft 18 and the inner surface of the housing section 14 thereby imparting a rotary motion to the shaft 18 as it is moved reciprocally linearly Within the housing 12 by the input means 20. An additional plurality of balls 26 are mounted within channels or passageways formed by matching straight grooves formed in opposed portions of the outer surface of the shaft and the inner surface of the housing section 16. The straight grooves are disposed parallel to the axis of the shaft 18 and, when filled with balls, thereby preclude relative rotary movement between the shaft and the housing portion 16. As a result, as the shaft 18 rotates the housing section 16 rotates therewith.

The housing section 14 includes as an integral part thereof structural fittings 28 only one of which is shown in FIG. 1 which are adapted for attachment to a structural member within the airfoil of the aerospace vehicle (not shown). It will therefore be noted that the housing section 14 being rigidly affixed to the airframe is precluded from moving relative thereto.

The housing section 16 includes as an integral part thereof surface fittings 30 only one of which is shown in FIG. 1 which is adapted for attachment to the control surface of the airfoil. The hinge line of the airfoil control surface (not shown) which is affixed to the member 80 is designed to be coincidental with the longitudinal axis 32 of the shaft 18.

It will therefore be seen that, as the shaft is reciprocated by the input means 20, the housing section 16 and the control surface attached to the surface fittings 30 forming a part thereof is caused to move. Such movement is illustrated particularly in FIG. 4 which illustrates angular rotation of the surface fittings 30 from one extreme position to a fully rotated second position shown in dashed lines in response to full stroke of the shaft 18 from one end of the housing 12 to the opposite end thereof within the limits provided for movement of the shaft 18.

As is clearly shown in FIG. 1, the shaft 18 has a plurality of helical grooves 34 formed in the surface of a first portion 36 thereof. A second portion 38 of the surface of the shaft 18 has a plurality of straight grooves 40 formed in the surface thereof. The two portions 36 and 38 of the surface of the shaft 18 are displaced longitudinally apart on the surface of the shaft 18.

The inner surface 41 of the first section 14 of the housing 12 defines a plurality of helical grooves 42 disposed opposed and matching the helical grooves 34 formed in the surface of the first portion 36 of the shaft 18. Similarly, the inner surface 44 of the housing section 16 defines a plurality of straight grooves 46 which are disposed opposed and matching the straight grooves 40 formed in the surface of the second portion 38 of the shaft 18. The opposed helical grooves form helical channels or passageways 51 and the opposed straight groove form straight channels or passageways 58 within which the balls travel. Preferably the helical grooves have a lead angle of no less than 30 degrees and no greater than 70 degrees.

Ball return means includes a passageway 48 formed in the housing section 14 as well as a passageway 50 formed in the housing section 16. As will be noted in FIG. 1, only two ball return passageways are illustrated in the housing section 14 and one in section 16. However, by referring to FIGS. 2 and 3, it will become apparent to those skilled in &he art that there is a ball return passageway 48*a* through 48*l* corresponding to each of the channels 51*a* and 51*l* formed by the helical grooves 34 defined by the surface of the first portion 36 of the shaft 18 and the opposed grooves 42 in the housing surface 41. Similarly for each of the straight channels 53*a* thorugh 53*o* formed by the straight grooves 40 in the portion 38 of the shaft 18 and the opposed grooves 46 in the housing section 16 inner surface 44 there is provided a ball return passageway 50*a* through 50*o*.

It will thus be seen that by providing a plurality of helical channels each independent from the other, and with its own independent return passageway as well as a plurality of straight channels, each independent from the other, with its own independent return passageway, the load borne by the actuator 10 is distributed throughout the structure thus providing a relatively high output power for the weight and volume of any given actuator.

As is illustrated in FIG. 1, the ball return passage ways 48 and 50 are straight longitudinal bores disposed parallel to the axis 32 of the shaft 18. The ability to utilize the straight bores through the housing section 14 for return of the balls 24 disposed in the helical channels 51 is provided by defining each of the helical grooves 42 in the inner surface 41 of the housing section 14 to traverse 360 degrees of the surface of the housing section 14. By so doing, the beginning and end of a helical groove 42 are at opposite ends of the inner surface 41 of the housing section 14. As a result, a straight bore 48 may be positioned so that its opposite ends match the beginning and the end of a helical groove 42. By then providing an appropriate ball deflector, one of which is shown at 52 and 59, at opposite ends of the appropriate channel 51 and ball return passageway 48, the balls may be deflected from the helical channel 51, into the return passageway 48, and from the return passageway into the helical channel 51. Thereby each of the helical channels as well as the entire ball return means including the passageway and the deflectors may be fully filled with balls to thereby provide only rolling friction to thus provide higher efficiency and a greater power output for power input of the actuator 10.

Similar ball deflectors, as shown at 54, are provided at each end of the ball return passageways 50 which cooperate with the straight channels 53. Again, the ball deflectors being positioned within the channel 53 deflect the balls from the channels 53 and into the ball return passageways 50 and then return the balls from the passageways 50 to the channels 53 thereby permitting straight channels with the corresponding ball return means including the deflectors and the passageways to be completely filled with balls resulting in low friction as above referred to.

It will be noted by those skilled in the art that the helical grooves extend further than 360 degrees around the shaft 18 portion 36 and such extension is by an amount equal to the relative angular movement of the section 16 of the housing 12 with the respect to the section 14 thereof. It will also be noted that the straight grooves in the shaft portion 38 extend beyond the length of the housing 12 section 16 fitted with balls by an amount equal to the linear stroke of the shaft 18 within the housing 12.

Although the ball deflectors 52, 54 and 58 may be formed in any manner desired, it has been found particularly effective to form such ball deflectors from a single member positioned at opposite ends of each of the sections 14 and 16 of the housing 12 such as shown at 55, 56, 62 and 64. In each case the inner surface thereof is machined so that a tongue or scoop as illustrated at 59 is seated within each of the helical channels 51 or a similar tongue 60 is provided for the straight channels 53.

Once assembled with appropriate bearings and seals as recognized by those skilled in the art, a cap 66 is held in place by appropriate tie rods 68 (only one of which is shown) interconnected to the section 14 of the housing 12 to retain all portions of the actuator 10 in an assembled fashion. The input means 20 would be appropriately attached to the flange 70 along with an appropriate seal. Lubricating means such as grease or oil would be inserted through the fitting 72 into the interior of the actuator 10 thus lubricating the balls, the opposed grooves and the ball return means thereby further reducing any friction that might be present.

Figure 5:
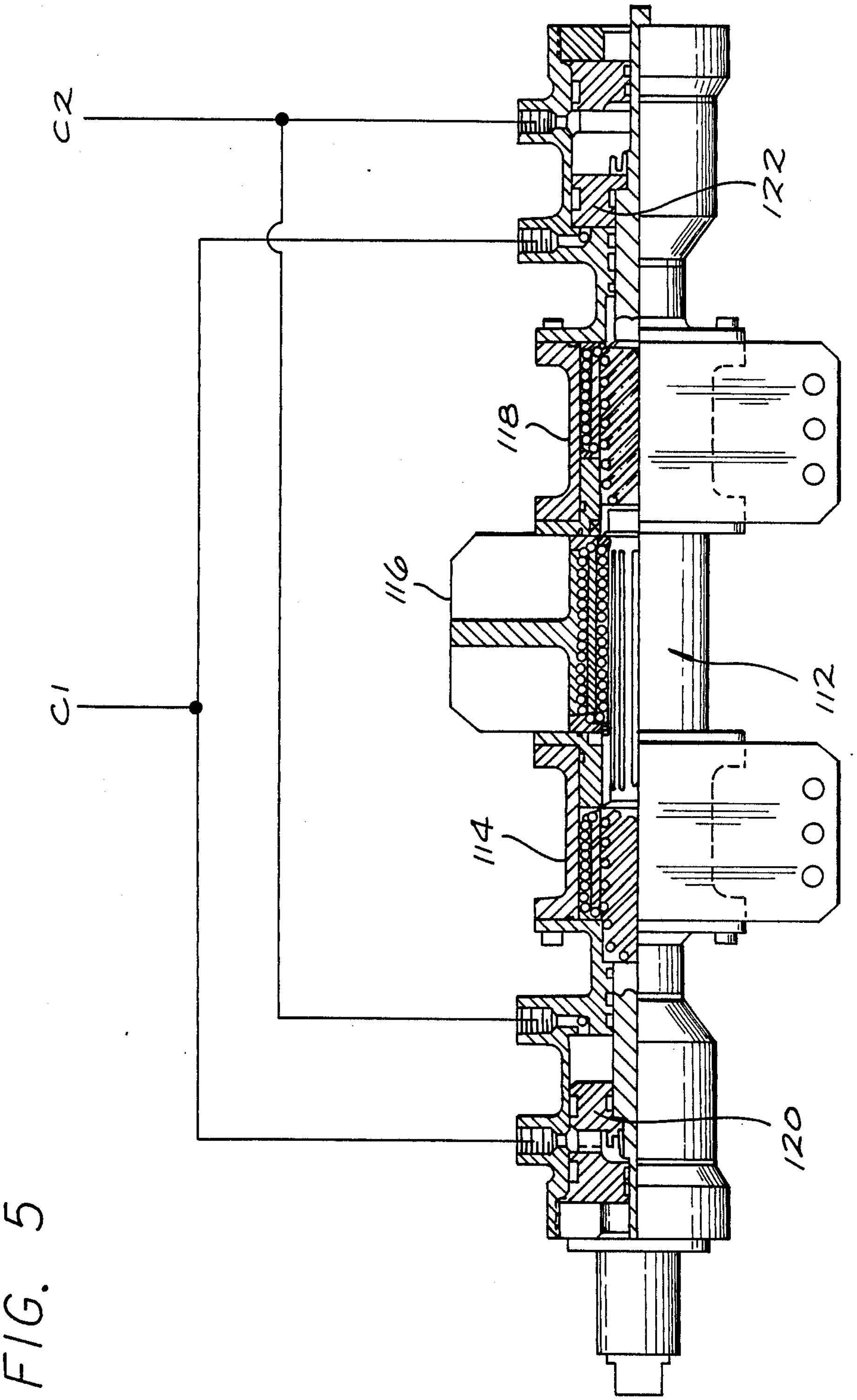
FIG. 5 is a plan view, partly in cross section, of an alternative embodiment of an actuator constructed in accordance with the principles of the present invention.

Referring now more particularly to FIG. 5 an alternative embodiment of an actuator constructed in accordance With the present invention is illustrated. As is shown therein the housing 112 may include portions 114 and 116 which would be identical to the portions 14 and 16 above described. In addition thereto another portion 118 may be provided which would be identical in structure to portion 114 in that the helical grooves would be provided between the shaft and the opposed inner portions of the housing sections thereof. Thus as can be seen, the straight grooved portion 116 would be flanked by helical grooved portions 114 and 118. The helical portions would have helical grooves of identical pitch and hand thereby imparting the appropriate angular movement of the section 116 as above described. Thus through utilization of the additional helical grooved portion 118 of the actuator additional load bearing capability is provided for the actuator.

As is also shown in FIG. 5, one form of input means 20 which may be utilized is a hydraulic piston means such as the pistons 120 and 122 which would be attached at opposite ends of the shaft of the actuator. Alternatively, a single hydraulic piston may be attached to only one end if such is desired. When a hydraulic actuator is utilized to impart the linear motion to the shaft as above described, hydraulic fluid under pressure would be applied, across the pistons 120 and 122 causing them to move in one direction or the other with the resulting linear movement of the shaft connected thereto as above described. It is thought that additional detailed description of the hydraulic mechanism and attendant source of fluid under pressure as well as the control means therefor is not required for those skilled in the art.

Figure 6:
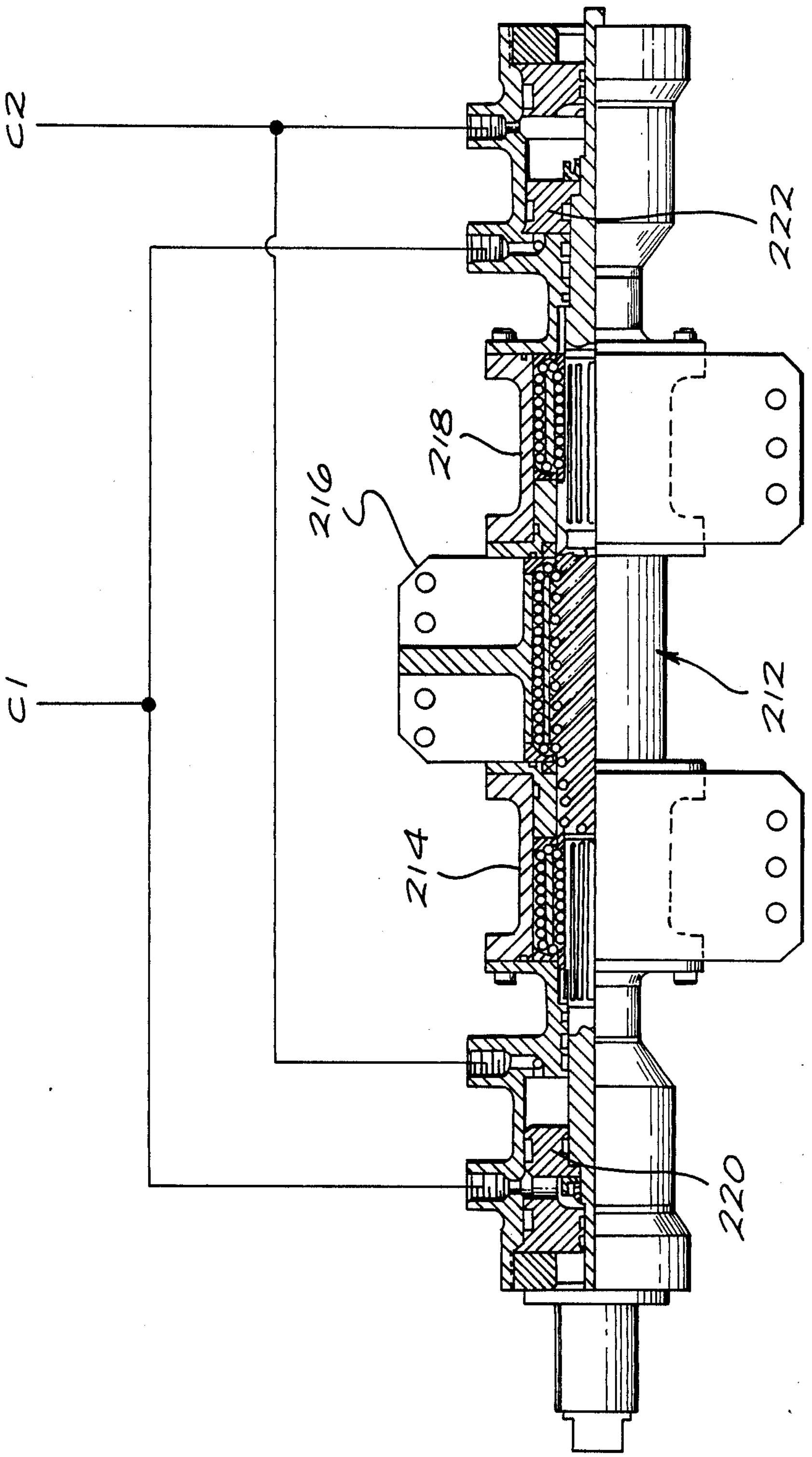
FIG. 6 is a plan view, party in cross section, of another alternative embodiment thereof.

Referring now more particularly to FIG. 6 there is illustrated another alternative embodiment of an actuator constructed according to the present invention. As is shown in FIG. 6 a helically grooved center section 216 is flanked by straight grooved end sections 214 and 218. An advantage to such a structure is that the hydraulic seals would not be subject to rotational movement as would be the case with the structure of FIG. 5.

There has thus been disclosed a linear input to rotary output ball screw actuator which has a low profile, a high power to weight and volume output, and which may function readily as a hinge line actuator for aerospace vehicle control surfaces.

What is claimed is:

1. A ball screw rotary actuator for converting a linear input motion to a rotary output motion and have recirculating balls therein comprising:

(A) A hollow housing having first and second sections, said first section being angularly relatively movable with respect to said second section:

(B) A shaft mounted for reciprocal movement within said housing, said shaft including:

(1) Helical groove means formed in the surface of a first portion thereof and;

(2) Straight groove means formed in the surface of a second portion thereof displaced longitudinally from said first portion, said straight groove means disposed parallel to the axis of said shaft;

(C) The interior faces of said first and second sections of said housing having groove means matching the groove means in said shaft portion disposed opposed thereto;

(D) Ball screw means defined by said housing;

(E) A plurality of balls disposed in and filling said matching groove means and said ball return means and;

(F) Means for imparting reciprocal linear movement to said shaft.

2. A ball screw rotary actuator as defined in claim 1 wherein said helical groove means includes a plurality of parallel grooves formed on said shaft.

3. A ball screw rotary actuator as defined in claim 2 wherein said straight groove means includes a plurality of parallel grooves formed on said shaft.

4. A ball screw rotary actuator as defined in claim 3 wherein said ball return means includes a separate return path for each of said helical grooves.

5. A ball screw rotary actuator as defined in claim 4 wherein said ball return means further includes a separate return path for each of said straight grooves.

6. A ball screw rotary actuator as defined in claim 5 wherein said plurality of balls completely fills each of said return paths, each of said helical grooves, and each of said straight grooves.

7. A ball screw rotary actuator as defined in claim 2 wherein each of said helical grooves in said housing traverses 360 degrees around the circumference of the interior face of said housing and said return path therefor is a straight bore through said housing with each end terminating adjacent an end of said helical groove in said housing.

8. A ball screw rotary actuator as defined in claim 7 wherein each of said helical grooves on said shaft traverses around the circumference of said shaft by an amount equal to 860 degrees plus the angular movement of said first section relative to said second section of said housing.

9. A ball screw rotary actuator as defined in claim 1 wherein said helical groove means includes a lead angle of at least 30 degrees.

10. A ball screw rotary actuator as defined in claim 9 wherein said lead angle is no greater than 70 degrees.

11. A ball screw rotary actuator as defined in claim 1 wherein said housing further includes a third section, said first section being disposed between said second and third section, said first section being moveable relative to said second and third sections, said shaft further includes additional helical groove means formed in the surface of a third portion thereof displaced longitudinally from said first portion in a direction opposite to said second portion, and the interior face of said third section of said housing having groove means matching the groove means in said third portion of said shaft.

12. A ball screw rotary actuator as defined in claim 11 wherein said helical groove means and said additional helical groove means each includes a plurality of grooves parallel to each other formed on said shaft of the same hand and lead angle.

13. A ball screw rotary actuator as defined in claim 12 wherein said straight groove means includes a plurality of grooves parallel to each other formed on said shaft.

14. A ball screw rotary actuator as defined in claim 13 wherein said ball return means includes a separate return path for each of said helical and each of said straight grooves.

15. A ball screw rotary actuator as defined in claim 14 wherein said plurality of balls fills each of said return paths, each of said helical grooves and each of said straight grooves.

16. A ball screw rotary actuator as defined in claim 15 wherein each of said helical grooves includes a lead angle of at least 30 degrees.

17. A ball screw rotary actuator as defined in claim 1 wherein said housing further includes a third section, said first section being disposed between said second and third section, said first section being moveable relative to said second and third sections, said shaft further includes additional straight groove means formed in the surface of a third portion thereof displaced longitudinally from said first portion in a direction opposite to said second portion, and the interior face of said third section of said housing having groove means matching the groove means in said third portion of said shaft.

18. A ball screw rotary actuator as defined in claim 17 wherein said straight groove means and said additional straight groove means each includes a plurality of grooves parallel to each other formed on said shaft.

19. A ball screw rotary actuator as defined in claim 18 wherein said helical groove means includes a plurality of grooves parallel to each other formed on said shaft.

20. A ball screw rotary actuator as defined in claim 19 wherein said ball return means includes a separate return path for each of said helical and each of said straight grooves.

21. A ball screw rotary actuator as defined in claim 20 wherein said plurality of balls fills each of said return paths, each of said helical grooves and each of said straight grooves.

* * * * *